United States Patent [19]

Smith, III

[11] Patent Number: 4,832,080

[45] Date of Patent: May 23, 1989

[54] PRESSURE BALANCED HYDRAULIC COUPLING WITH METAL SEALS

[76] Inventor: Robert E. Smith, III, 1316 Staffordshire Rd., Stafford, Tex. 77477

[21] Appl. No.: 146,319

[22] Filed: Jan. 21, 1988

Related U.S. Application Data

[63] Continuation of Ser. No. 13,000, Feb. 10, 1987, Pat. No. 4,754,780.

[51] Int. Cl.⁴ .................... F16L 29/00; F16L 37/22
[52] U.S. Cl. ................... 137/614.04; 251/149.1; 251/900; 277/27; 277/102; 277/205; 277/236; 285/111; 285/917
[58] Field of Search .............. 137/614.01, 614.02, 137/614.03, 614.04, 614.05; 251/149.1, 149.8, 149.9, 900; 277/27, 102, 205, 236; 285/190, 111, 917, 95, 345, 900

[56] References Cited

U.S. PATENT DOCUMENTS

| | | | |
|---|---|---|---|
| 1,237,309 | 8/1917 | Dewald | 285/111 |
| 1,736,922 | 11/1929 | Kohlen | 285/111 |
| 2,218,318 | 10/1940 | Pfauser | 137/614.04 |
| 2,854,258 | 9/1958 | Hickey et al. | 137/614.04 |
| 3,215,161 | 11/1965 | Goodwin et al. | 137/614.04 |
| 3,236,251 | 2/1966 | Comer | 137/614.04 |
| 3,348,575 | 10/1967 | Simak | 137/614.05 |
| 3,507,523 | 4/1970 | Cadley | 285/307 |
| 3,516,524 | 6/1970 | Kelty et al. | 192/3.3 |
| 3,618,690 | 11/1971 | Johnson | 251/900 |
| 3,707,878 | 1/1973 | Treichler | 92/164 |
| 3,777,771 | 12/1973 | De Visscher | 137/614.04 |
| 3,797,510 | 3/1974 | Torres et al. | 137/614.04 |
| 4,124,228 | 11/1978 | Morrison | 285/1 |
| 4,188,038 | 2/1980 | Goedicke | 277/236 |
| 4,222,411 | 9/1980 | Herzan et al. | 137/614.04 |
| 4,348,039 | 9/1982 | Miller | 285/1 |
| 4,455,040 | 6/1984 | Shinn | 277/236 |
| 4,694,859 | 9/1987 | Smith, III | 137/614.04 |
| 4,709,726 | 12/1987 | Fitzgibbons | 137/614.04 |

FOREIGN PATENT DOCUMENTS

| | | | |
|---|---|---|---|
| 663132 | 8/1929 | France | 137/614.04 |
| 1142462 | 9/1957 | France | 137/614.04 |
| 76801 | 10/1961 | France | 137/614.04 |
| 1491524 | 7/1967 | France | 137/614.04 |
| 343726 | 2/1960 | Switzerland | 137/614.04 |
| 552435 | 4/1941 | United Kingdom | 137/614.04 |

Primary Examiner—George L. Walton

[57] ABSTRACT

A pressure-balanced hydraulic coupling for use in undersea drilling and production operations, the coupling having radial passageways communicating between the male and female members such that substantial fluid pressure is not exerted against the face of either member during coupling or uncoupling or during the coupled state. Check valves in both the male and female members are opened when the male member probe is fully inserted into the receiving chamber of the female member. Mutually opposed valve stems extending from each check valve contact one another to effectuate the simultaneous opening of each check valve, and allow fluid to flow through a valve port and then radially through matching fluid passageways in the male and female members. The radial passageways of the male and female members match up at their longitudinal surfaces so that fluid pressure between the male and female members is in a substantially radial direction and is not exerted at the face of either member. Metal seals may be used to seal the annulus formed between the male and female members when they are coupled. The metal seals may be pressure-energized in response to fluid pressure in the coupling to enhance the sealing effect.

5 Claims, 3 Drawing Sheets

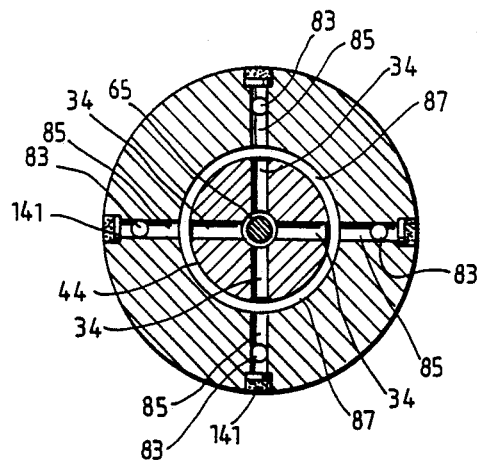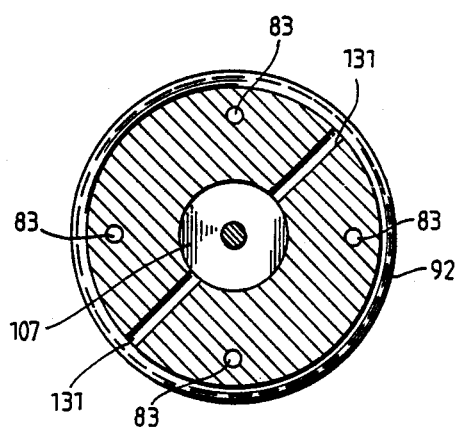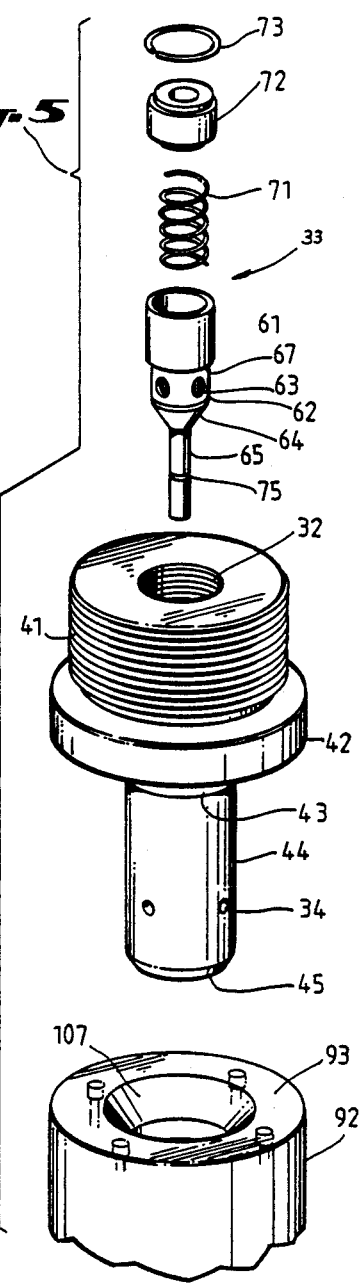

PRESSURE BALANCED HYDRAULIC COUPLING WITH METAL SEALS

RELATED APPLICATIONS

This application is a continuing application of U.S. Ser. No. 013,000, filed Feb. 10, 1987, now U.S. Pat. No. 4,754,780. Benefit of the filing date of U.S. Ser. No. 013,000 is hereby claimed.

BACKGROUND OF THE INVENTION

1. Field of the Invention

This invention relates, in general, to hydraulic couplings, and specifically to hydraulic couplings used in undersea drilling and production applications. More particularly, the invention involves a pressure balanced hydraulic coupling wherein the fluid pressure does not exert a separating force between the male and female members.

2. Description of the Related Art

Subsea hydraulic couplings are old in the art. The couplings generally consist of a male and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

Problems arise with the use of hydraulic couplings in relatively high pressure systems due to the high axial forces imposed on the male and female members during the coupling operation and during their use. In such couplings, it is necessary for the fluid force opposing the face of the male or female member to be overcome before the fluid communication is established between the members. In a relatively high pressure system, high forces imposed on the valve members may render the connection of the male member very difficult. Also, during use, fluid pressure is exerted between the male and female members in such as way as to tend to separate them. The force necessary to join the members and the resultant tendency of the body members to separate are characteristic problems in the prior art. High pressure systems and undersea applications also experience problems associated with sealing the junction between the male and female members.

Ideally, hydraulic couplings should, as far as possible, be pressure balanced, so that fluid pressure does not hinder connection or urge separation of the male and female members. Preferably, to prevent loss of fluid in coupling or uncoupling, the members should include valve means to open automatically on coupling and close automatically on uncoupling. Finally, the coupling should employ seals which can withstand high pressures as well as the corrosive effects of undersea or other adverse environments. The present invention solves all of these needs and requirements.

SUMMARY OF THE INVENTION

The present invention resides in a hydraulic coupling of the foregoing type, including male and female members for fluid communication therebetween such that fluid passages are mutually positioned to allow connection or disconnection of the coupling without substantial fluid pressure exerted axially against the face of the male member. The fluid passages also are mutually positioned so as to substantially prevent separation forces between the male and female members when the passages are pressurized by fluid. Metal seals are employed to seal the annulus formed when the male member is inserted into the female member.

The fluid communication between the male and female members in the present invention preferably is established between a radial passageway at the outer longitudinal surface of the male member and a matching radial passageway in the side wall of the receiving chamber of the female member. When the male member is fully inserted into the receiving chamber of the female member, fluid communication between the two members is established through the matched radial passageways. The leading faces of mutually opposed valve stems in the two members come into contact with one another, and thereby urge check valves in the respective members into the open position. When in the open position, fluid may flow through valve ports defined by the open check valves and through the radial passageways inboard of the valve seats. Radially-expanding metal seals are positioned about the circumference of the male member such that the radial passageways are between the seals. Fluid pressure in the coupling urges the seals to sealingly engage the receiving chamber wall and the circumference of the male member.

BRIEF DESCRIPTION OF THE DRAWINGS

FIG. 3 is a cross-section view of the coupling along the lines 3—3 of FIG. 2.

FIG. 4 is a cross-section view of a coupling taken along the lines 4—4 of FIG. 2.

FIG. 5 is an exploded perspective view of the male member of a coupling according to the present invention.

DETAILED DESCRIPTION OF THE PREFERRED EMBODIMENT

Figure 1:
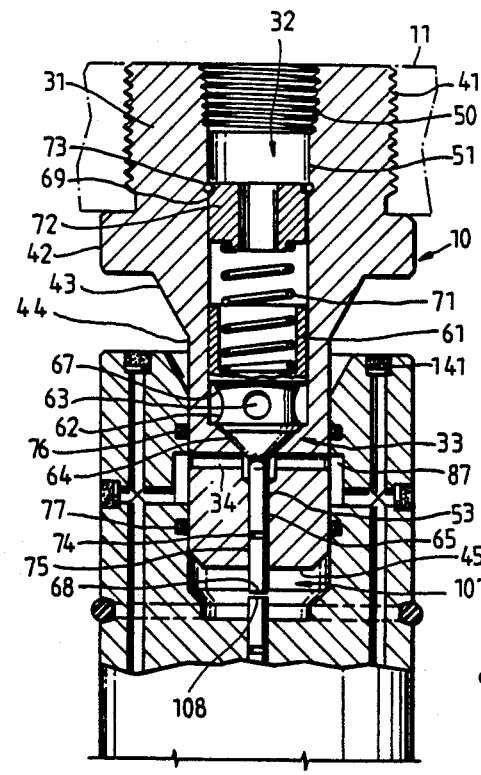
FIG. 1 is a section view of the male member partially inserted into the female member of a coupling according to the present invention.

Referring generally to FIG. 1, a preferred embodiment of the present invention comprises a male member 10, a female member 20 and fluid passageways establishing fluid communication between the male member and female member when the male member is inserted into the female member. The fluid communication is established without significant pressure exerted against the face of the male member during or after insertion. The fluid communication between the male member and female member is established radially via a passageway in the outside longitudinal surface of the male member to a corresponding radial fluid passageway in the receiving chamber of the female member.

Figure 2:
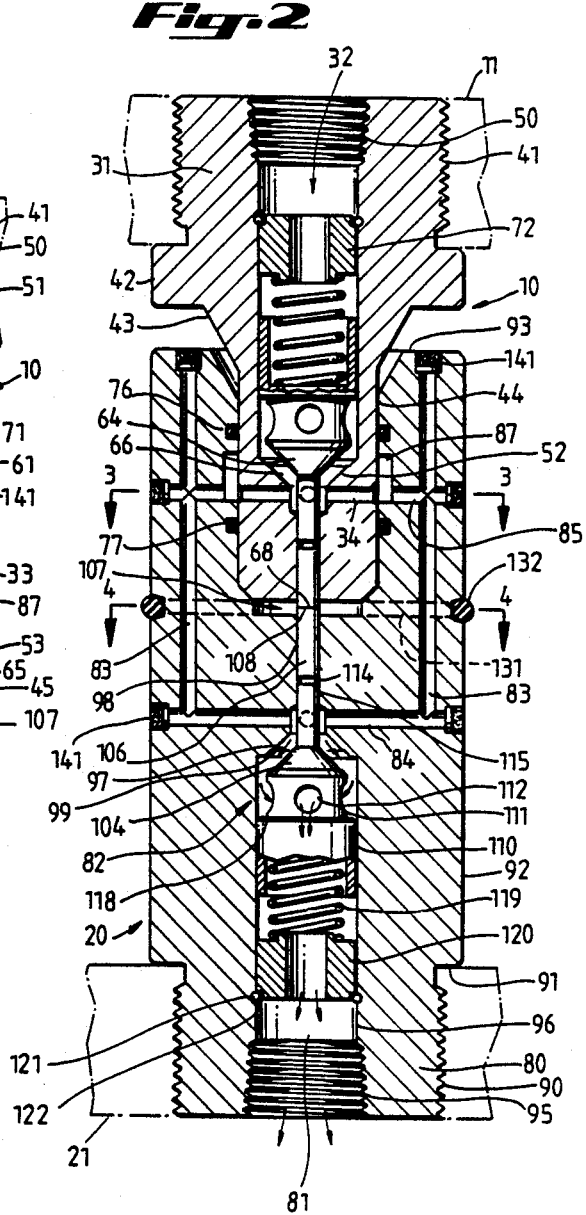
FIG. 2 is a section view of the male member fully inserted into the female member of a coupling according to the present invention.

In the embodiment shown in FIG. 1 and FIG. 2, the male member 10 comprises a body 31, a central bore 32, a valve assembly 33, and a radial passage 34. The body 31 of the male member first comprises a handle 41 which optionally is threaded or otherwise connected to a manifold plate 11. The male member 10 and female member 20 are generally connected to opposing plates of a manifold and are held together by bolts or hydraulic members attached to the plates of the manifolds. The male member is commonly attached to one plate 11, while the female member is attached to an opposing plate 21 so as to face the male member and align with it. The male and female members may be attached to the manifold plates using various means, such as set screws or threads. Techniques for attaching the members to such manifold plates are well known to those skilled in the art.

As shown in FIG. 1 and FIG. 2, the male member 10 includes a handle 41 which terminates at flange 42 of male member and tapered shoulder 43. The shoulder 43 is tapered down to the first end of the cylindrical probe wall 44 which terminates at probe face 45. The cylindrical probe wall 44 is adapted for sliding engagement with the female member, as will be discussed below. The body 31 of the male member, which is cylindrical in shape, thus includes handle 41, flange 42, shoulder 43, probe wall 44, and probe face 45.

The body of the male member also is provided with a central bore 32. The bore 32 may have several variations in its diameter as it extends through the body of the male member 10. In a preferred embodiment, the first end of the central bore comprises an internally threaded section 50 for connection to a hydraulic line. Adjacent and inboard of the threaded section is a cylindrical passageway 51 extending longitudinally within the male member body and terminating at valve seat 52 which is an inclined shoulder. Adjacent to the valve seat is cylindrical passage 53 having a reduced diameter which comprises a receiving bore for the valve stem 65. In the embodiment shown in FIG. 1, the valve stem bore 53 is narrower than the cylindrical passageway 51 for receiving the valve stem 65 slidably therethrough.

As shown in FIG. 1, the valve assembly 33 is slidably received within the central bore 32 of the male member. The various parts of the valve assembly of the male member also are shown in an exploded perspective view of the male member in FIG. 5. The valve assembly comprises a cylindrical hollow valve head 61 which has an outer diameter dimensioned to slide within the cylindrical bore 51 of the male member, and a hollow cylindrical body section 62 having an outer diameter somewhat less than the diameter of the valve head. The cylindrical body section 62 includes valve body apertures 63 for fluid flow from the hollowed portion of the valve to the exterior of the valve. The cylindrical body section 62 terminates at valve face 64 which is conical in shape and dimensioned to seat within the valve seat 52 at the end of the male member bore. Extending from the valve face 64 is a valve stem 65 which is cylindrical in shape and extends along the longitudinal axis of the male member. The valve stem 65 is located at the apex of the conical shape of the valve face and is slidably received within the valve stem bore 53 of the male member, extending through the valve port 66.

Helical valve spring 71 is used to urge the valve face 64 into a closed position against the valve seat 52. The helical valve spring 71 is located within the cylindrical passageway 51 and anchored at hollow spring collar 72 which is held in place by collar clip 73 inserted within the spring collar bore 69 at the inner surface of the cylindrical passageway 51 of the male member 10 as shown in FIG. 1. The opposite end of the helical valve spring 71 is in contact with the shoulder 67 between the hollow valve head 61 and the hollow cylindrical body section 62. The valve face 64 is urged into a closed position against the valve seat 52 due to the helical valve spring 71.

Also shown in FIG. 1, annular valve stem seal 74 surrounding the outer circumference of valve stem 65 is secured within the valve stem seal groove 75 to seal the valve stem from fluid loss through the valve stem bore 53.

When the valve face 64 is in a closed position against the valve seat 52 as shown in FIG. 1, the valve assembly 33 seals fluid off from flowing between the central bore 32 and the radial passages 34 of the male member. One or more radial passages 34 in the body of the male member extend outwardly between the downstream or inboard side of the valve seat 52 and the outer circumference of the probe wall 44 of the male member. Annular probe seals 76 and 77 are situated about the circumference of the female receiving bore and are used to seal off fluid from escaping at the upstream or downstream side of the radial passageways 34 and 85 in the male and female members. The inboard probe seal 76 and outboard probe seal 77 thus help assure that fluid flow is directly and radially between the male member 10 and the female member 20. The probe seals 76 and 77 may be elastomer O-ring type seals, or equivalent, or may be metal seals which are pressure-energized to seal the annulus between the male and female. This metal seal alternative will be more fully described below.

As shown in FIG. 2, the valve assembly 33 of the male member 10 and the valve assembly 82 of the female member 20 are each urged into an open position when the valve stem face 68 of the male member contacts the mutually opposed valve stem face 108 of the female member. The valve port 66 in the male member 10 is defined between the valve face 64 and the valve seat 52 when the valve assembly 33 is in an open position. Fluid then may flow through the male member 10 via the central passageway 32, the valve body apertures 63, the valve port 66 and the radial passageways 34. Fluid flow is thus directed into the radial passageways 85 of the female member 20 between the inboard and outboard probe seals 76 and 77.

The female member 20 comprises a body 80, a central bore 81, a valve assembly 82, and a passageway having radial sections 84, 85 and a longitudinal section 83 for fluid flow therethrough. The body 80 of the female member includes handle 90 which is optionally threaded to the manifold plate 21. Female member body 80 also includes a shoulder 91 which is adjacent to the handle 90 and the main cylindrical body 92 which terminates at the female member face 93. The central bore 81 has several variations in its diameter, as it extends through the body 92 of the female member 20. At a first or outer end of the central bore 81 is a threaded internal passageway 95 for connection to a threaded hydraulic line. The threaded portion 95 of the central bore 81 terminates at cylindrical passageway 96 which slidably receives a valve assembly 82. Cylindrical passageway 96 terminates internally at valve seat 97 for seating the valve face 104. Inboard of the valve seat 97 is narrowed valve stem bore 98 which slidably receives the valve stem 106 of the valve assembly 82 of female member 20. Adjacent to the valve stem bore 98 is a cylindrical receiving chamber 107 which slidably receives the probe of the male member 10. As shown in FIG. 2, when the face 68 of the valve stem 65 of the male member 10 and the mutually opposed face 108 of the valve stem 106 of the female member 20 are slidably engaged in contact with one another, the valve assemblies 33 and 82 are forced into open positions for fluid flow in the radial passageways between the male and female members.

In a preferred embodiment of the present invention, the valve assembly 82 of the female member 20 is substantially similar to the valve assembly 33 of the male member 10 and comprises a hollow valve head 110 which is slidably received within the cylindrical passageway 96 of the female member 20. The female member valve assembly 82 further comprises hollow cylindrical body section 111 adjacent to the valve head 110. The cylindrical body section 111 has an outer diameter somewhat less than the outer diameter of the hollow valve head 110. The cylindrical body section 111 includes valve body apertures 112 for fluid flow between the inside and outside of the cylindrical body section 111. Adjacent to the cylindrical body section 111 is a valve face 104 which is generally conical in shape for seating at the valve seat 97, and valve stem 106 which is an elongated cylindrical section terminating in valve stem face 108. The valve stem 106 is located at the apex of the conical shape of the valve face 104 and extends through the valve port 90. The valve stem 106 of the female member 20 further is provided with valve stem seal 114 which is positioned in the annular valve stem seal groove 115. The valve stem seal 114 thus prevents fluid loss through the valve stem bore 98.

To urge the female member valve assembly 82 into the closed position, a helical valve spring 119 is mounted between the shoulder 118 of the valve head 110 and spring collar 120 having collar clip 121 within clip groove 122. The valve assembly 82 of the female member 20 and valve assembly 33 of the male member 10 are generally identical in components and function. When each valve is in an open position wherein the mutually opposed faces 68 and 108 of the two valve stems are in contact with each other as shown in FIG. 2, the helical valve spring bias is insufficient to keep the check valves in the closed position. The passageways for fluid communication between the male member and the female member thereby allow fluid flow without any significant pressure exerted on the leading face 45 of the male member 10.

The fluid passageways in the female member 20 comprise a first radial passageway 84 directed radially from the inboard end of the valve seat 97, a second radial passageway 85 positioned at the receiving chamber 107 of the female member 20, and a longitudinal passageway 83 connecting between the first and second radial passageways 84 and 85. When the male member 10 is fully inserted within the female member 20, the radial passageway 34 at the outer circumference of the probe wall 44 of the male member 10 matches the second radial passageway 85 of the female member 20 for fluid flow therebetween. An annular slot 87 cut about the circumference of the receiving chamber 107 of the female member 20 makes it possible to obtain fluid communication between the male and female members without precise alignment of the male member and the female member or exact rotational orientation of the male member with respect to the female member. The inboard and outboard probe seals 76 and 77 in the sides of the receiving chamber 107 of the female member 20 seal off fluid flow except between the respective radial passageways 34 and 85 of the male and female members. Fluid flow at the point of contact between the male and female members is perpendicular to the longitudinal axis of the male and female members where the radial passageway 34 of the male member 10 and second radial passageway 85 of the female member 20 communicate. Thus, there is no longitudinal force exerted by the fluid between the male and female members.

A cross-section view, taken along the plane referenced 3—3 in FIG. 1, shows the fluid passages of a preferred embodiment of the coupling in FIG. 3. As shown, four radial passageways 34 extend between the inboard end of the valve seat 52 of the male member 10 and the outer circumference of the probe wall 44. It will be recognized that any number of fluid passageways 34 may be used according to the present invention, depending on the fluid flow characteristics desired.

Still referring to FIG. 3, showing a cross-section of the male member 10 inserted into the female member 20, second radial passageways 85 of the female member 20 are shown extending between the slot 87 in the receiving chamber 107 of the female member 20 and the longitudinal passageways 83. The annular slot 87 is cut about the circumference of the receiving chamber 107 of the female member 20 so that fluid communication between the male and female members is established even if each radial passageway 34 of male member 10 is not longitudinally or rotationally aligned with a second radial passageway 85 of the female member 20. As mentioned above, one, two, four, or any other number of fluid passageways may be employed according to the present invention without departing from the inventive concept. In fact, the number of radial passageways 34 and 85 need not be equal, although in the preferred embodiment, the radial passageways 34 and 85 are equal in number.

Preferably, when the male member is inserted into the female member, each radial passageway 34 of the male member 10 will match a separate second radial passageway 85 of the female member 20, so that the passageways 34 and 85 are mutually positioned to facilitate fluid communication between the members. However, the annular slot 87 permits rotation of the male member 10 relative to the female member 20 and axial movement of the male member 10 relative to the female member 20 while maintaining radial fluid communication therebetween.

In the preferred embodiment of the present invention, manufacture of the male and female members involves machining or drilling of the fluid passageways therethrough. Because the radial sections 84, 85 and longitudinal sections 83 of the fluid passageways are machined or drilled in the female member 20, the passageways extend through to the outer circumference of the female member and to the female member face 93, respectively. These extensions of the radial and longitudinal fluid passageways of the female member are sealed with plugs 141 to prevent loss of fluid. It will be understood that these passageway extensions and the corresponding plugs 141 are not essential to the inventive concept. If another manufacturing technique for producing the device, such as casting, is employed, the passageway extensions and plugs 141 would not be required and may not be present.

As shown in FIG. 2 and in cross-section in FIG. 4, the female member 20 further includes one or more vent passages 131 for expelling water from the receiving chamber 107 of the female member 20. Each vent passage 131 connects between the central receiving chamber 107 and the outer surface of the female member 20. An annular vent hole seal 132 in a vent seal groove 133 is used to allow fluid flow only outwardly from the receiving chamber 107 when the male member 10 is inserted into the female member 20 and fluid is urged out of the central receiving chamber 107.

As one embodiment of the present invention is specifically adapted for use in subsea applications separation of the male and female members under water allows the entry of seawater into the receiving chamber 107 of the female member. Although this seawater is prevented from entry into hydraulic lines because of the valve assemblies 33 and 82, when the male member 10 begins to enter the receiving chamber 107, a hydraulic "lock" may develop within the chamber to prevent adequate entry of the male member 10. The vent passage 131 provides a means for the trapped seawater to be forced from the receiving chamber 107 upon entry of the male member 10. Further, should annular probe seal 77 or valve stem seals 74 and 114 develop a fluid leak, the resulting build-up of hydraulic fluid pressure within the receiving chamber 107 will be obviated by the vent passage 131. The fluid may escape through the vent passage and pressure will not build up to exert a separation force between the male and female members.

Figure 6:
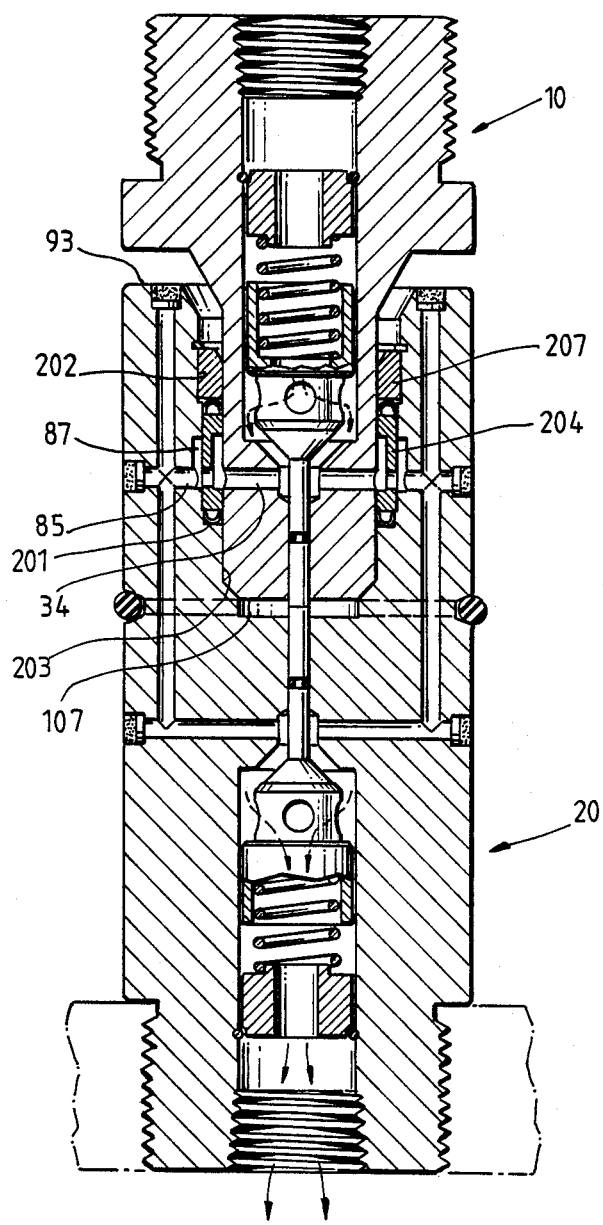
FIG. 6 is a section view of the male member fully inserted into the female member provided with metal seals according to the present invention.

The female member 20 may be modified to accommodate the use of metal seals to seal between the male member 10 and the receiving chamber 107. As shown in FIG. 6, the receiving chamber 107 includes a first annular shoulder 201 about its circumference, resulting in the receiving chamber 107 having an area of larger diameter, defined by wall 202, and an area of smaller diameter, defined by wall 203. The slot 87 is formed in the wall 202 in the area of larger diameter and the second radial passageway 85 terminates in the slot 87 as before.

Figure 7:
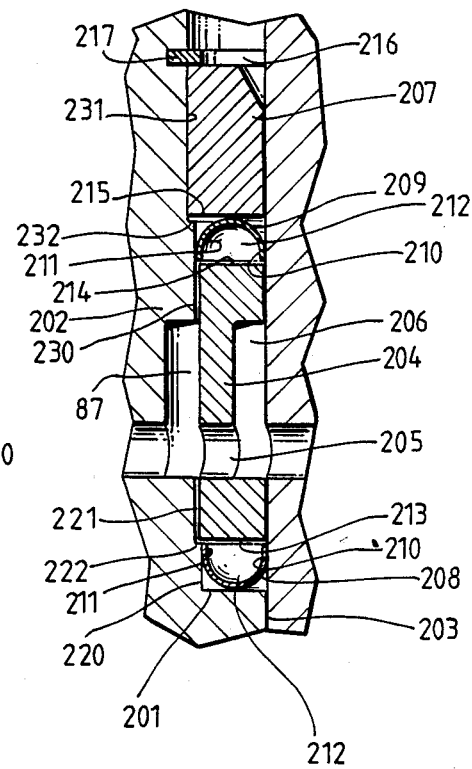
FIG. 7 is a section view of the metal seals of FIG. 6.

The area of the larger diameter defined by wall 202 may have several variations in its diameter as it extends between first annular shoulder 201 and female member face 93. The variations in diameter define one or more annular shoulders in addition to the first annular shoulder 201. In a preferred embodiment as shown in FIG. 7, the wall 202 comprises a first inner wall 220 between the first annular shoulder 201 and a second annular shoulder 222. A second inner wall 221 is between the second shoulder 222 and the inboard end of slot 87. A third inner wall 230 extends between the outboard end of slot 87 and a third annular shoulder 232. A fourth inner wall 231 is between the third annular shoulder 232 and female member face 93. The second shoulder 222 and third shoulder 232 provide stops for positioning of metal seal retainers 204 and 207 within the receiving chamber 107.

The metal seal retainers comprise an inner retainer 204 and an outer retainer 207, each retainer being adapted to position the inner metal seal 208 and outer metal seal 209, respectively. The inner retainer 204 is a cylindrical, sleeve-like element having an outside diameter approximately equal to the diameter of the receiving chamber 107 in the area of the wall 202. The inner retainer 204 is thus adapted to slide into the receiving chamber 107, limited in its longitudinal extent by the first shoulder 201. The inner diameter of the inner retainer 204 is approximately equal to the diameter of the receiving chamber 107 in the area of the wall 203. The wall thickness of the inner retainer 204 is slightly greater than the width of the first shoulder 201.

The inner retainer 204 includes radially-directed ports 205 which extend through the wall of the retainer 204. An annular retainer slot 206 is formed in the inner wall of the retainer 204 and, as will be discussed more fully below, serves the same purpose as the annular slot 87 in the receiving bore 107. That is, exact longitudinal and rotational alignment between the radial passageways 34 in the male member 10 and the ports 205 in the retainer 204 is not required, as the fluid may flow through the slot 206.

The outer retainer 207 is similar to the inner retainer 204 in that it is a cylindrical, sleeve-like element having an outer diameter approximately equal to the diameter of the receiving chamber 107 in the area of the wall 202 and an inner diameter approximately equal to the diameter of the receiving chamber 107 in the area of the wall 203. Thus, the outer retainer 207 has a wall thickness slightly greater than the combined width of shoulders 201, 222 and 232 and is adapted for sliding insertion into the receiving chamber 107.

Inner metal seal 208 and outer metal seal 209 are C-shaped elements having inside diameters defined by inner edges 210, outside diameters defined by outer edges 211, and cavities 212. The outside diameters of the seals 208 and 209 are approximately equal to the outside diameter of the retainers 204 and 207. The inside diameters of the seals 208 and 209 are approximately equal to the inside diameters of the retainers 204 and 207.

The inner metal seal 208 is inserted into the receiving chamber 107 and is allowed to rest on the first shoulder 201. The seal 208 is oriented such that its cavity 212 opens away from the first shoulder 201, as shown in FIG. 7.

The inner retainer 204 is next inserted into the receiving chamber 107 and its end 213 abuts the inner seal 208 generally at the seal's inner and outer edges 210 and 211. The inner retainer 204 rests on the second annular shoulder 222. The shoulder 222 helps to prevent any misalignment of the retainer and also prevents excessive compression or crushing of the metal seal 208 during assembly and interconnection of the coupling. After the inner retainer 204 is inserted into the receiving chamber and rests upon the shoulder 222, the metal seal 208 is positioned for pressurization, as will be more fully explained below. When the inner retainer 204 is thusly located, the ports 205 are closely aligned axially, although the slot 87 allows for some misalignment.

The outer metal seal 209 is next inserted into the receiving chamber and rests on the end 214 of the inner retainer 204. The outer seal 209 is oriented such that its cavity 212 opens toward the end 214 of the inner retainer 204.

The outer retainer 207 is inserted into the receiving chamber 107 and its end 215 abuts the outer seal 209. The outer retainer 207 rests on the third annular shoulder 232. The shoulder 232 helps to properly align the retainer, and prevents undesirable excessive compression or crushing of the metal seal 209 during assembly and interconnection of the coupling members. This ensures that the metal seal 209 is positioned for sealing when it is fluid pressurized.

A retainer clip groove 216 is formed in the wall 202 and receives a retainer clip 217. The retainer clip 217 has an inside diameter less than the outside diameter of the outer retainer 207 and, when positioned in the groove 216, traps the retainer 207 in the receiving chamber 107. Thus, the inner seal 208, the inner retainer 204, the outer seal 209 and the outer retainer 207 are captured in the receiving bore 107. The positions of the second annular shoulder 222 and third annular shoulder 232, the lengths of the retainers 204 and 207, and the heights of the seals 208 and 209, may be chosen such that a slight axial compression is imposed on the seals 208 and 209 when the retainer clip 217 is in place. Such an axial compression will cause the seals 208 and 209 to slightly expand radially and that action may be desirable in certain applications.

The male coupling member 10 described above and shown in FIGS. 1, 2, and 5 may be used with the female member 20 shown in FIG. 6 without modification. When the male member 10 is inserted into the receiving bore 107 of the female member 20 shown in FIG. 6, the male 10 extends through the outer retainer 207, the outer seal 209, the inner retainer 204 and the inner seal 208. The inner edges 210 of the seals 209 and 208 engage the circumference of the male member in a sealing relationship and this condition is satisfied prior to the mutual engagement of the valve stems 65 and 106. Therefore, as in the case of the probe seals 76 and 77 shown in FIGS. 1 and 2, the metal seals 208 and 209 provide a fluid seal between the male and female members prior to the communication of fluid between the members. Also, as in the case of the slot 87, the annular slot 206 allows for longitudinal or rotational misalignment between the radial passageways 34 in the male member and the ports 205 in the inner retainer 204.

When a coupling utilizing the female member shown in FIG. 6 is assembled and pressurized, fluid communication is established between the male and female members by means of the radial passageways 34, the retainer slot 206, the ports 205, the slot 87, the second radial passageways 85, the longitudinal passageways 83 and the first radial passageways 84. When that fluid path is established, fluid pressure is transmitted to the cavities 212 of the inner and outer metal seals 208 and 209. The fluid is not sealed from the cavities 212 and, thus, the seals 208 and 209 are pressurized. The fluid will enter the cavities 212 after passing by either the outside diameter or inside diameter of the inner retainer 204, as the outside and inside diameters of the retainer are not in sealing relationship with the female and male members, respectively. The fluid pressure in the cavities 212 will urge the inner edges 210 and outer edges 211 of the seals to move radially, thereby urging the seals 208 and 209 to expand radially to increase their outside diameters and decrease their inside diameters. The outer edges 211 will be forced against the female member wall 202 while the inner edges 210 will be forced against the circumference of the male member 10. The sealing effect will be enhanced by the presence of fluid pressure in the seal cavities 212.

Although variations in the embodiment of the present invention may not each realize all the advantages of the invention, certain features may become more important than others in various applications of the device. The invention, accordingly, should be understood to be limited only by the scope of the appended claims.

What is claimed is:

1. A coupling comprising:
   a female body member having
      a central bore extending along the longitudinal axis of the female member from a first end to a second end;
      a fluid bore generally parallel to the central bore;
      first and second radial bores extending from the fluid bore to the central bore for communication of fluid therebetween;
      a first shoulder in the central bore intermediate the ends of the body and intermediate the first and second radial bores;
   a sleeve-like inner retainer for insertion into the central bore at a location adjacent the second radial bore, the inner retainer having a radially-directed port for fluid communication with the second radial bore;
   a first ring-shaped metal seal for positioning between the first shoulder and the inner retainer;
   a sleeve-like outer retainer for engagement with the central bore;
      a second ring-shaped metal seal for positioning between the inner retainer and the outer retainer;
      a male member for insertion through the outer and inner retainers and through the first and second metal seals, the male member having a longitudinal fluid passage and a third radial bore extending between the fluid passage and the outer circumference of the male member, the third radial bore adapted for location adjacent the radially-directed port in the inner retainer to provide fluid communication from the fluid passage in the male member to the fluid bore in the female member,
      the first and second metal seals adapted to sealingly engage the central bore of the female member and to sealingly engage the circumference of the male member as the fluid is communicated through the radially-directed port.

2. The coupling of claim 1, wherein the first and second metal seals have cavities in communication with fluid in the coupling, the seals responsive to fluid pressure in the cavities to be urged to expand radially into sealing contact with the central bore of the female member and with the circumference of the male member.

3. The coupling of claim 1, wherein the central bore has a second shoulder for positioning the inner retainer longitudinally within the central bore, and a third shoulder for positioning the outer retainer longitudinally within the central bore.

4. A coupling, comprising:
   a male member having a leading face, a central bore, a fluid passage extending radially from the central bore to a lateral surface of the male member, and first valve means to control fluid flow between the central bore and the fluid passage;
   a female member having a receiving chamber for receiving the male member, a central bore, a fluid passage having a first section extending radially from the central bore, a second section extending radially from the receiving chamber, and a longitudinal section interconnecting the first and second radial sections, the female member including second valve means to control fluid flow between the central bore and the fluid passage in the female;
   inner and outer metal seals for location in the receiving chamber of the female member for sealing engagement with the receiving chamber and with the lateral surface of the male member, the metal seals spaced longitudinally in the receiving chamber with the second section of the fluid passage in the female member situated axially between the seals; and an inner retainer and an outer retainer insertable within the receiving chamber for preloading the inner and outer metal seals, to expand radially into sealing contact with the receiving chamber and to sealingly engage the male member when inserted within the receiving chamber, whereby fluid is communicated through port means within at least one of said retainers to urge the seals radially against the receiving chamber and the lateral surface of the male member and through the first and second valve means and the fluid passages in the male and female members.

5. The coupling of claim 4, wherein the first and second metal seals each comprise a ring-shaped seal having an inside and outside diameter and a cavity therebetween, the inside diameter configured to engage the lateral surface of the male member and the outside diameter configured to engage the receiving chamber, each seal being oriented such that its cavity is exposed to fluid pressure in the fluid passages of the male and female members, the fluid pressure in the cavity tending to urge the seals to move radially against the receiving chamber and the lateral surface of the male member.

* * * * *